Patented July 25, 1939

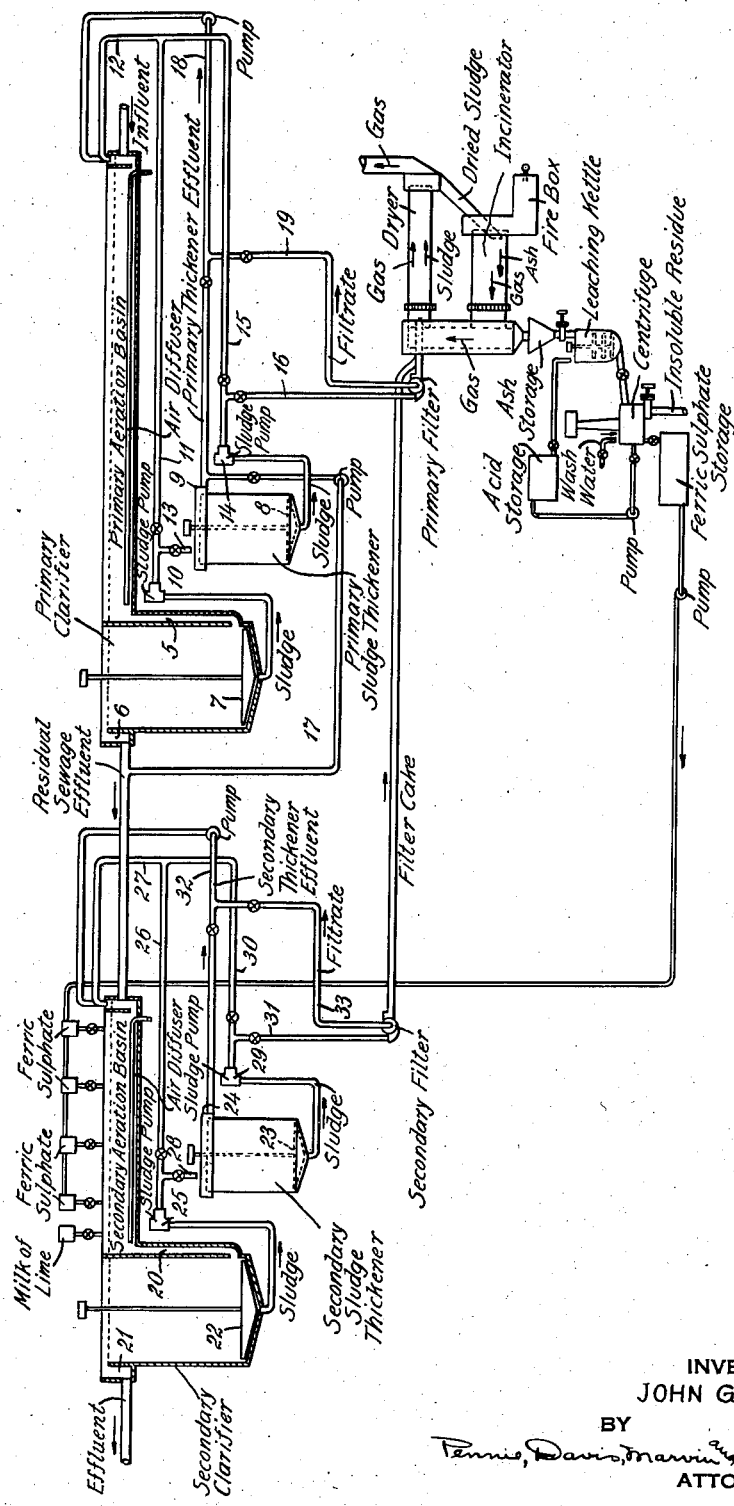

2,167,443

UNITED STATES PATENT OFFICE 2,167,443

TREATING SEWAGE

John G. Bevan, New York, N. Y., assignor to Guggenheim Brothers, New York, N. Y., a copartnership Application December 28, 1934, Serial No. 759,450

5 Claims. (Cl. 210—2)

This invention relates to sewage treatment and has for an object the provision of an improved process for treating sewage and similar waste liquors. More particularly, the invention contemplates the provision of an improved process for removing putrescible matter from sewage and similar waste liquors. The invention further contemplates the provision of an improved flexible process for treating sewage in which the amounts of putrescible matter are subject to variation. A further object of the invention is to provide an improved two-stage process for removing putrescible matter from sewage and similar waste liquors.

According to a preferred two-stage process of the invention, raw sewage, after screening, is subjected to controlled aeration to effect coagulation of a portion of the putrescible matter in the absence of any substantial amount of added chemical coagulating agent, and the residual sewage, after separation of the coagulated putrescible matter is subjected to the action of a chemical coagulating agent to effect coagulation of a further portion of the putrescible matter. Preferably, the aeration treatment of the raw sewage is conducted in the presence of returned sludge containing putrescible matter coagulated during the aeration treatment of raw sewage and without the addition of any chemical coagulating agent. The treatment of the residual sewage is conducted in the presence of returned sludge containing putrescible matter coagulated during the treatment of residual sewage with a coagulating agent.

In ordinary raw sewages and similar waste liquors, putrescible matter, consisting of carbon, hydrogen, sulphur, etc. in various combinations, is present in two forms, namely: (1) insoluble (suspended matter), (2) soluble. In any sewage treating operation, it is customary to remove the coarser insoluble matter by screening. After screening, the concentration of the insoluble putrescible matter remaining in the sewage is extremely low, for example, an average municipal sewage contains around 150 to 200 parts per million of dispersed or finely divided solid matter largely in colloidal suspension. This finely divided putrescible matter includes simple and complex compounds resulting from the breaking down of proteins. The amount of putrescible matter in the sewage from any locality varies at different periods of the day and night, and it is desirable to employ for the treatment of sewage a process which can be readily adjusted in accordance with such variations.

The present invention contemplates certain improvements in the removal of putrescible matter from sewage by coagulation, flocculation or entrainment in a settleable sludge, and the provision of a flexible process capable of being adjusted readily to treat effectively sewages in which the amounts of putrescible matter are subject to wide fluctuations. The invention further contemplates the provision of an improved process, involving removal of suspended putrescible matter, in which removal of dissolved putrescible matter is also effected. I have discovered that the removal of putrescible matter (suspended and dissolved) from sewage is promoted by subjecting the sewage to a preliminary aeration treatment in the presence of returned sludge containing putrescible matter coagulated during the course of the aeration treatment, and subjecting the residual sewage, after separation of the returned sludge and the putrescible matter coagulated during the aeration treatment, to the action of a coagulating agent. The treatment of the residual sewage is preferably conducted in the presence of returned sludge containing putrescible matter coagulated during the course of the treatment of residual sewage with a coagulating agent.

The aeration step or stage of the complete process of the invention is designed to effect coagulation of a portion only of the suspended and dissolved putrescible matter. Coagulation of an additional amount of putrescible matter sufficient to permit the production of a suitably pure or clean effluent liquor is effected in the stage or step of the process in which an added coagulating agent is employed. When the amount of suspended matter in the sewage is below average or normal, the aeration treatment effects conditioning of the putrescible matter to such a degree that very small amounts of coagulating agents are required in the second stage or step. The second stage or step of the process of the invention may be carried out with the use of any desirable amount of coagulating agent to provide protection against unpredictable and unexpected changes in the character of sewage. In any event, the adjustment of the amount of coagulating agent employed may be accomplished simply to give whatever rapid and effective control that may be required for the treatment of sewages varying in strength.

The process of the invention has many advantages in addition to those mentioned above. Following are some of the additional advantages:

(1) A considerable portion of the ammonia is destroyed during the course of the aeration treatment. Experimental results indicate that as much as half of the ammonia is oxidized.

(2) A part of the putrescible matter in the sewage is coagulated during the aeration treatment. The coagulating agent employed for treatment of the residual sewage completes the desired coagulation and permits the production of a very clear effluent having a low B. O. D. (5 day). The returned sludge containing putrescible matter coagulated during the treatment of the residual sewage with the coagulating agent is especially effective as an aid in clearing the effluent of suspended matter.

(3) Certain of the compounds in solution in the sewage are partially oxidized during the aeration treatment, and the partially oxidized compounds are precipitated when the residual sewage is subjected to the action of the coagulating agent.

(4) The organic nitrogen remaining in the residual sewage is largely destroyed in the stage or step of the process in which the residual sewage is subjected to the action of an added coagulating agent. This is especially true when the residual sewage is subjected to the action of sludge containing putrescible matter coagulated during the treatment of the residual sewage with an added coagulating agent.

(5) The process of the invention permits economy in the use of coagulating agents. Effective elimination of putrescible matter can be accomplished through the use of relatively small amounts of chemical coagulating agents.

Satisfactory aeration is obtained with from about 0.01 to 0.1 cubic feet of air per gallon of sewage treated. The period of aeration may be varied considerably. Good results may be obtained if aeration in the first stage or step of the process is carried out for a period of about one hour or less, and little or no additional advantage may be gained by continuing aeration for a period of time longer than about one hour in the treatment of domestic sewages. In the treatment of waste industrial liquors such as packing house waste, the period of aeration may be extended advantageously to about one and one-half or two hours.

Any suitable chemical coagulating agent may be employed in treating the residual sewage, and any suitable method of treating the sewage with the coagulating agent may be employed. I may employ, for example, aluminum chloride; aluminum sulphate; ferrous sulphate; ferric sulphate; ferric chloride; ferrous oxide; ferric oxide; bauxite; ferric hydroxide; chlorine; chlorinated copperas; sulphuric acid; manganese sulphate; acid treated sludge, such for example, as sludge produced in the treatment of sewage with an iron compound, after treatment with sulphuric acid in amount sufficient to react with the iron contained therein to produce ferric sulphate; incinerator ash produced in incinerating sludge produced in treating sewage with a coagulating agent such, for example, as ash produced by incinerating sludge obtained by treating sewage with an iron compound; and ashes resulting from the burning of coal. The chemical coagulating agents may be employed separately or in any desired combination with one another, and they may be added to the residual sewage separately or in combination at any suitable time or point, and they may be added in the solid condition or in solution in suitable solvents.

For the second stage or step of the process of my invention, I may employ any suitable chemical precipitation process or coagulation process, such, for example, as the first stage or step of the process described in the United States patent to Gleason and Loonam No. 1,886,267 dated November 1, 1932; or the process described in the United States patent to Gleason and Loonam No. 1,956,420 dated April 24, 1934; or the process described in my copending application Serial No. 738,781, filed August 7, 1934 (Patent No. 2,021,679, dated November 19, 1935).

In carrying out the first stage or step of a preferred process of my invention, the returned sludge is preferably added to the sewage at the commencement of the aerating treatment or shortly after the raw sewage enters the aeration vessel. Following the aeration treatment, the sewage is introduced into a clarifier underneath a layer or blanket of settling sludge so that the residual sewage flows upwardly through the sludge blanket and overflows from the clarifier with practically all coagulated putrescible matter removed.

In carrying out the second stage or step of the process of my invention, I may disperse the coagulating agent in the residual sewage in any suitable manner, as, for example, by mechanical agitation or by air agitation. Air agitation may be carried out in any suitable manner as, for example, by injecting one or more streams of air into the body of liquid to be aerated or by employing mechanical agitation means capable of effecting the introduction and dispersion of air. Air agitation and mechanical agitation may be employed together in any suitable manner. I prefer to employ air agitation, in accordance with the procedure outlined in my aforementioned copending application, to obtain the combined advantages of dispersion of the coagulating agent and oxidation of impurities by the oxygen of the air. For the treatment of weak residual sewages, mechanical agitation alone produces satisfactory results. Effective coagulation of the putrescible matter of the residual sewage generally can be accomplished by treatment of the residual sewage with a coagulating agent for a period of about 5 to 30 minutes.

In carrying out the second stage or step of a preferred process of the invention, the returned sludge is added to the residual sewage at the commencement of the aerating treatment or shortly after the residual sewage enters the aeration vessel. A coagulating agent, such, for example, as a metal compound may be added to the residual sewage at any desired stage of the aerating treatment. When a coagulating agent such as ferric sulphate is employed, it is preferably added to the residual sewage during the course of its aeration within about two to fifteen minutes prior to the completion of the aerating treatment. Aluminum sulphate also is preferably added within about two to fifteen minutes prior to the completion of the aeration treatment. Ferrous sulphate is preferably added to the sewage within about ten to thirty minutes before the end of the aeration treatment.

Good results may be obtained if the period of aeration following the addition of the ferric sulphate or aluminum sulphate to the residual sewage is just sufficient to permit thorough dissemination of the compound. The period of aeration may be varied considerably. Good results may be obtained if aeration of the residual sewage is carried out for a period of about one-half hour or less, and little or no additional advantage may be gained by continuing aeration for a period of time longer than about one hour.

After the first aeration stage, if the pH of the residual sewage is 7 or lower and it is desired to increase the pH to a value above 7, an amount of an alkaline agent such as lime sufficient to increase the pH to the desired value may be added prior to the completion of the treatment with the coagulating agent. Usually, it will not be necessary or desirable to adjust the pH of the residual sewage by the addition of an alkaline agent, as I have found that highly satisfactory precipitation, settling and clarification can be obtained even when the pH is considerably below 7. If the addition of an alkaline agent is desired or required for any purpose, it is preferably added after the coagulating agent has been added and thoroughly disseminated throughout the sewage. When satisfactory coagulation and sedimentation can be achieved without adjustment of the pH by the addition of an alkaline agent, or if, for any other reason, the pH of the sewage is higher than the pH of effluent which should be discharged into a stream or body of water, the pH may be adjusted advantageously by the addition of the alkaline agent to the final or secondary clarifier effluent. Adjustment of the pH at this point requires the use of smaller amounts of alkaline agent, two to five parts per million usually being sufficient.

When ferrous sulphate is employed as the coagulating agent, it is advisable to adjust the pH by the addition of an alkaline agent such, for example, as lime. A pH of about 7 may be satisfactory, but a pH of about 7.6 to 7.8 is preferred.

Following the treatment with a coagulating agent, the sewage is introduced into a clarifier underneath a layer or blanket of settling sludge so that the treated sewage flows upwardly through the sludge blanket and overflows from the clarifier with a practically negligible amount of suspended matter.

In carrying out the process of the invention in its preferred and complete form, the raw sewage after appropriate screening is mixed with returned sludge in a primary aeration vessel and aeration of the mixture is commenced. The primary aeration vessel employed is preferably of the type which permits a continuous flow of the sewage undergoing treatment from an entrance end to a discharge end and the rate of flow is preferably controlled to provide a period of about one hour between the time of entry and the time of discharge of the sewage. Aeration of the sewage is preferably continued throughout its entire period of detention in the primary aeration vessel. The first stage or step of the process of the invention is preferably so controlled that elimination of an appreciable amount of the putrescible matter of the sewage undergoing treatment is effected. The first stage or step of the invention may be controlled advantageously to effect elimination of about 50% or more of the putrescible matter of the raw sewage.

Following the aeration treatment in the primary aeration vessel, the sewage passes to a primary clarifier, into which it is introduced near the bottom, passing upwardly through a blanket of settling sludge. Residual sewage overflows and settled sludge is removed from the bottom of the primary clarifier, preferably being raked or otherwise mechanically worked along the bottom of the clarifier toward the sludge discharge outlet.

The sludge from the bottom of the primary clarifier may be conducted in part to a primary thickener and in part to the primary aeration vessel. Residual sewage overflows and settled sludge is removed from the bottom of the primary thickener. The primary clarifier and primary thickener effluents may be combined for subsequent treatment, or the primary thickener effluent may be returned to the primary aeration vessel for further treatment. The sludge from the primary thickener, containing about 3% to 10% solids, may be conducted in part to the primary aeration vessel and in part to a primary suction filter where its moisture content is reduced. All of the sludge returned may be obtained from the primary clarifier, all may be obtained from the primary thickener, or a portion may be obtained from the primary thickener and a portion from the primary clarifier. About 20% to 75%, more or less, of the sludge is returned to the primary aeration vessel. The amount of sludge returned may vary considerably. Ordinarily, sludge return may be controlled advantageously to establish in the sewage-sludge mixture undergoing treatment in the primary aeration vessel an amount of suspended matter equal to about two to eight times the amount of suspended matter in the incoming raw sewage.

The residual sewage from the primary clarifier, or the residual sewage from the primary clarifier and the primary thickener in the event that the primary clarifier and primary thickener effluents are combined, is mixed with returned sludge in a secondary aeration vessel and aeration of the mixture is commenced. The secondary aeration vessel advantageously may be of the same type and construction as but smaller than the primary aeration vessel. The rate of flow of the residual sewage through the secondary aeration vessel is preferably controlled to provide a period of about 30 minutes between the time of entry and the time of discharge of the residual sewage. Aeration of the residual sewage is preferably continued throughout its entire period of detention in the secondary aeration vessel.

As the mixture undergoing treatment is flowing through the secondary aeration vessel, a coagulating agent such as a soluble iron compound, preferably in the form of a ferric sulphate solution of 50 grams per liter concentration is added to the mixture at a point corresponding to an interval of about 2 to 15 minutes before the time of discharge of the mixture from the vessel. Prompt diffusion of the solution throughout the mixture is produced by the agitation resulting from aeration. The oxygen in the air keeps the iron in the ferric condition. When a ferrous salt such as ferrous sulphate is employed, the oxygen of the air converts the iron to the ferric condition.

The incoming raw sewage ordinarily has a pH of around 7 to 7.5. In the coagulating treatment of the residual sewage in the secondary aeration vessel, the trivalent metal ions are precipitated, probably in the form of ferric hydroxide as well as in the form of simple and complex organic ferric compounds. The sulphate ions of the added ferric sulphate tend to lower the pH of the sewage to a value below 7, but this tendency is largely counteracted by the effects of the aeration and the returned sludge, and the residual sewage at the conclusion of the ferric sulphate treatment may have a pH equivalent to that of the incoming raw sewage. Substantially all the iron added as ferric sulphate is precipitated, and it appears that this precipitated iron together with the iron returned with the sludge forms a blanket of ferric hydroxide which acts as a collector of suspended matter. The returned sludge and the aeration treatment also aid in effecting coagulation of the suspended matter. Also, aeration causes oxidation of a considerable amount of the dissolved putrescible matter.

The amount of iron added to the sewage depends to some extent at least, upon the amount of putrescible matter in the sewage. In the treatment of the average municipal sewages, 5 to 25 parts per million of iron products satisfactory coagulation and precipitation, and, generally, less than 20 parts per million of iron produce satisfactory results. In the treatment of industrial waste liquors such, for example, as dairy plant and packing plant waste liquors, 20 to 50 parts per million of iron may be required to produce satisfactory coagulation and precipitation. Satisfactory aeration is obtained with a total of from 0.01 to 0.1 cubic foot of air per gallon of sewage treated in both stages or steps of the process. It appears that the oxygen of the air employed for aeration in the secondary aeration vessel functions chiefly to oxidize putrescible matter and is not absorbed by the sludge. This is indicated by rapid elimination of dissolved putrescible matter and the presence of dissolved oxygen in the secondary clarifier overflow.

As hereinbefore pointed out, adjustment of the pH of the sewage undergoing treatment in the secondary aeration vessel may be dispensed with, and adjustment of the pH may be carried out by the addition of a suitable agent to the final or secondary clarifier effluent.

If adjustment of the pH is desirable following the treatment with ferric sulphate, the sewage may be treated in the presence of an alkaline agent, such as lime, in amount sufficient to give a pH of the desired value. Adjustment of the pH to a value above 7 may sometimes improve settling and filtration. Lime is preferable to other alkaline agents for this operation because it gives a denser floc and one which settles very rapidly, and because it is inexpensive. Lime is preferably added to the sewage as milk of lime in 50 grams per liter concentration. Where dissolved putrescible matter is to be subsequently removed from the sewage liquor by a base exchange (zeolite) treatment, for example, in accordance with the process of the aforementioned patent to Gleason and Loonam No. 1,886,267, it is preferable to carefully regulate the amount of lime added to the sewage to give a pH of about 7.2 to 7.6. Following the treatment with lime, the residual sewage passes to a secondary clarifier, into which it is introduced near the bottom, passing upwardly through a blanket of settling sludge. Clarified liquor overflows and settled sludge is removed from the bottom of the clarifier, preferably being raked or otherwise mechanically worked along the bottom of the clarifier towards the sludge discharge outlet. The supernatant liquor overflowing from the secondary clarifier is substantially free from suspended matter. If exceptionally high purification is desired, including high ammonia removal, the liquor may advantageously be subjected to a base exchange treatment as described in the aforementioned patent to Gleason and Loonam.

The sludge from the bottom of the secondary clarifier may be conducted in part to a secondary thickener and in part to the secondary aeration vessel. Clarified liquor overflows and settled sludge is removed from the bottom of the secondary thickener. The secondary clarifier and secondary thickener effluents may be combined for appropriate disposal or for subsequent treatment, but the secondary thickener effluent is preferably returned to the secondary aeration vessel for retreatment with the residual sewage. The sludge from the secondary thickener, containing about 3% to 10% solids, may be conducted in part to the secondary aeration vessel and in part to a suction filter where its moisture content is reduced. For filtering, the excess sludge from the secondary thickener may be combined with the excess sludge from the primary thickener or the sludge from the primary thickener and the sludge from the secondary thickener may be treated in separate filter units. If the sludge from the primary thickener is combined with the sludge from the secondary thickener for filtration, the filter effluent or filtrate is preferably returned to the secondary aeration vessel or to the secondary thickener. If the sludge from the primary thickener and the sludge from the secondary thickener are filtered separately, the filter effluent resulting from filtration of the sludge from the primary thickener is preferably returned to the primary thickener or to the primary aeration vessel, and the filter effluent resulting from filtration of the sludge from the secondary thickener is preferably returned to the secondary thickener or to the secondary aeration vessel.

All of the sludge returned to the secondary aeration vessel may be obtained from the secondary clarifier; all may be obtained from the secondary thickener; or a portion may be obtained from the secondary thickener and a portion from the secondary clarifier. About 20% to 75%, more or less, of the sludge is returned to the secondary aeration vessel. The amount of sludge returned may vary considerably. Ordinarily, sludge return may be controlled advantageously to establish in the sewage-sludge mixture undergoing treatment in the secondary aeration vessel an amount of suspended matter equal to about two to eight times the amount of suspended matter in the raw sewage.

The sludge from the primary clarifier and the sludge from the secondary clarifier may be thickened in separate thickeners, as indicated above, or combined and thickened in the same apparatus. When the sludge from the primary clarifier and the sludge from the secondary clarifier are combined for thickening, the total amount of sludge returned to the primary aeration vessel or basin is preferably taken from the primary clarifier, and the total amount of sludge returned to the secondary aeration vessel or basin is preferably taken from the secondary clarifier.

Combining of the sludges for thickening and/or filtration may eliminate the necessity of conditioning the sludge prior to filtration, or may reduce the amounts of reagents required to effect conditioning. Separate filtration of separately thickened sludges may require reduction of the pH of the sludge produced in the first stage or step by the addition of an agent such as ferric sulphate and raising of the pH of the sludge produced in the second stage or step by the addition of an agent such as lime or sodium nitrate.

The sludge from the first stage or step of the process of the invention is suitable for digestion, and it may be sent to digestion instead of being filtered and incinerated.

It is my preferred practice to completely destroy the organic matter in the filter cake by incineration. A rotary kiln incinerator consisting of two sections, namely, a drying section and a burning section is admirably adapted for the purpose. In both the dryer and incinerator sections of the unit, the air travels concurrently with the solids and gases. The dryer section is operated at a temperature which does not cause decomposition or carbonization of the sludge, and the incinerator section is operated at a temperature of about 650-700° C. This incinerating temperature is sufficiently high to destroy the putrescible matter. The incinerating temperature is preferably kept below 700° C. so that sintering of the residue is avoided. A substantial amount of the heat required for incinerating is obtained by the burning of the sludge. In fact, the calorific value of the sludge is such that in a large scale operation no extraneous fuel is required for incineration.

The incinerated residue may be treated with sulphuric acid for the regeneration of the ferric sulphate which may be again used in the process, or the incinerated residue may be employed as a coagulating agent in the second stage of the process of the invention.

The single figure of the accompanying drawing is a diagrammatic flowsheet of a system adapted for carrying out the process of the invention.

The raw sewage is first passed through a coarse screen and then through a fine screen (not shown in the drawing) to remove coarse and heavy solid matter. The screened sewage is treated according to the process of the invention.

In the apparatus illustrated in the drawing, aeration of the raw sewage is carried out in a primary aeration vessel in the form of a long tank or basin one end portion of which receives the incoming sewage and the other end portion of which discharges into a primary clarifier. Returned sludge is added to the raw sewage as it enters the primary aeration basin and thorough mixing of the sludge and sewage is accomplished by air agitation. In this apparatus, the rate of flow of the sewage through the primary aeration basin is such as to give a detention period of about one hour. A common air diffuser extends throughout the length of the primary aeration vessel and provides a source of air for aeration and agitation. The air diffuser may be of any suitable construction.

The primary clarifier illustrated in the drawing comprises a tank having a peripheral charging well 5 (extending approximately around one third of the circumference of the tank) and discharging into the bottom of the tank. Residual sewage overflows into a launder 6 opposite the charging well and extending approximately around one-third of the upper circumference of the tank. A raking mechanism 7 moves sludge settling on the bottom of the tank towards the centrally positioned sludge discharge outlet.

Sludge from the primary clarifier is pumped by means of a pump 10 to a primary thickener having a sludge raking mechanism 8 and an overflow launder 9, or in part to the primary thickener and in part to the entrance end of the primary aeration vessel. The sludge pump 10 communicates with a conduit 11 which leads to a sludge return conduit 12. A by-pass conduit 13 is provided for conducting sludge from the pump 10 and conduit 11 to the primary thickener. Suitable valves are provided in the conduits 11 and 13 to control and distribute the flow of sludge therethrough. The primary clarifier and primary thickener effluents may be combined for appropriate subsequent treatment in the secondary aeration vessel, or the primary thickener effluent may be returned to the entrance end of the primary aeration vessel. Conduits 17 and 18 having suitable valves and pumps therein are provided to permit the primary thickener effluent to be combined with the primary clarifier effluent for treatment in the secondary aeration vessel or returned to the entrance end of the primary aeration vessel.

A portion of the sludge from the primary thickener may be conducted by means of a pump 14 and conduit 15 to the sludge return conduit 12 leading to the entrance end of the primary aeration vessel. The remainder of the sludge from the primary thickener is conducted through the conduit 16 to a primary suction filter. Suitable valves are provided in the conduits 15 and 16 to control and distribute the flow of sludge therethrough. A conduit 19 communicates with the primary filter and the return conduit 18 and permits the return of the filtrate to the entrance end of the primary aeration vessel.

The sludge returned to the primary aeration vessel (20% to 75%, more or less) may be returned entirely either from the primary clarifier or from the primary thickener, or a portion may be returned from the primary clarifier and a portion from the primary thickener. The sludge returned to the primary aeration vessel may be aerated prior to its return.

Aeration of the residual sewage is carried out in a secondary aeration vessel similar to the primary aeration vessel and comprising a long tank or basin one end portion of which receives the incoming residual sewage and the other end portion of which discharges into a secondary clarifier. The secondary aeration basin or vessel may have a capacity smaller than the capacity of the primary aeration basin or vessel. The relative sizes of the aeration basins or vessels may be proportional to the times or periods of aeration employed in the two stages or steps of the process. The secondary aeration basin or vessel advantageously may comprise two or more separately operable compartments to permit variations in times or periods of treatment. Returned sludge is added to the residual sewage as it enters the secondary aeration basin, and thorough mixing of the sludge and sewage is accomplished by air agitation. In this apparatus, the rate of flow of the residual sewage through the aeration basin is such as to give a detention period of about one-half hour. Ferric sulphate solution is preferably added to the residual sewage in the secondary aeration basin at a point corresponding to an interval of about 2 to 15 minutes before the time of discharge of the sewage into the secondary clarifier, but provision is made for the addition of the ferric sulphate at a number of points between the entrance end and the discharge end of the basin. The ferric sulphate may be added to the residual sewage in the secondary aeration vessel at one or more points during the course of flow of the sewage through the aeration vessel. If the addition of an alkaline agent is required or desired for adjustment of the pH of the sewage, milk of lime is added between the point of addition of the ferric sulphate and the discharge end of the secondary aeration vessel and spaced sufficiently from the point of addition of the ferric sulphate to permit thorough dissemination of the ferric sulphate in the sewage before the lime is added. A common air diffuser extends throughout the length of the aeration vessel and provides a source of air for aeration and agitation. The air diffuser may be of any suitable construction.

The secondary clarifier is similar to the primary clarifier and comprises a tank having a peripheral charging well 20 (extending approximately around one third of the circumference of the tank) and discharging into the bottom of the tank. Clarified liquor overflows in a launder 21 opposite the charging well and extending approximately around one-third of the upper circumference of the tank. A raking mechanism 22 moves sludge settling on the bottom of the tank towards the centrally positioned sludge discharge outlet. It is to be understood that forms and types of clarifiers other than those shown and described may be used in practicing the invention. I have found that the introduction of the sewage near the bottom of a settling chamber beneath a settling mass of sludge therein materially aids in the production of a supernatant liquor substantially free from coagulated suspended matter.

Sludge from the secondary clarifier is pumped by means of a pump 25 to a secondary thickener having a sludge raking mechanism 23 and an overflow launder 24, or in part to the secondary thickener and in part to the entrance end of the secondary aeration vessel. The sludge pump 25 communicates with a conduit 26 which leads to a sludge return conduit 27. A by-pass conduit 28 is provided for conducting sludge from the pump 25 and conduit 26 to the secondary thickener. Suitable valves are provided in the conduits 26 and 28 to control and distribute the flow of sludge therethrough. The secondary clarifier and secondary thickener effluents may be combined for appropriate disposal or for subsequent treatment, as, for example, by zeolite filters as described in the aforementioned patent to Gleason and Loonam, or the secondary thickener effluent may be returned to the entrance end of the secondary aeration basin. A conduit 32 having a suitable pump and valve included therein is provided to permit return of the secondary thickener effluent to the entrance end of the secondary aeration basin.

A portion of the sludge from the secondary thickener may be conducted by means of a pump 29 and conduit 30 to the sludge return conduit 27 leading to the entrance end of the secondary aeration vessel. The remainder of the sludge from the secondary thickener is conducted through a conduit 31 to a secondary suction filter. Suitable valves are provided in the conduits 30 and 31 to control and distribute the flow of sludge therethrough. A conduit 33 having a suitable valve included therein communicates with the secondary filter and the return conduit 32 and permits the return of the filtrate to the entrance end of the secondary aeration basin.

The sludge returned to the secondary aeration vessel (20% to 75%, more or less) may be returned entirely either from the secondary clarifier or from the secondary thickener, or a portion may be returned from the secondary clarifier and a portion from the secondary thickener.

The filter cake is conveyed to the dryer and incinerator. Both the dryer and incinerator are rotatably mounted cylinders in which the solid material and gases (for drying and incinerating) travel concurrently. Thus, the exhaust gas from the incinerator moves through the dryer concurrently with the sludge, and the dried sludge enters the incinerator along with hot gases from an oil burner or other heating means. An adequate amount of oxygen or other combustion supporting gas enters the incinerator (along with the hot gases of combustion of the extraneous fuel) to burn the organic and other combustible matter in the dried sludge. The incinerated residue or ash is discharged from the incinerator to a storage container from whence it is appropriately fed to a jacketed leaching kettle. In the kettle, the incinerated residue is treated with sulphuric acid, being appropriately agitated and also heated if necessary, for the regeneration of ferric sulphate. The contents of the kettle is delivered to a centrifuge for the removal of excess acid. The centrifuged cake is leached with water to dissolve the ferric sulphate present and the insoluble residue is filtered off and discarded. The regenerated ferric sulphate solution is pumped back for reuse in the coagulation of residual sewage.

It will of course be understood that the apparatus illustrated in the drawing is merely illustrative and is not intended to be restrictive of the invention in any respect.

In the following table are given the daily results obtained in tests conducted for the purpose of illustrating the results obtainable by means of the process of the present invention. In carrying out the tests of the process of the invention, about 75% of the sludge obtained in the clarifiers (containing about 1% to 4% solids) was returned directly from the primary and secondary clarifiers to the primary and secondary aeration vessels, respectively. Aeration was continued for one hour periods in the primary aeration vessel and twenty minute periods in the secondary aeration vessel, and ferric sulphate and aluminum sulphate were added to the secondary aeration vessel about five minutes before the end of the aeration period. The biochemical oxygen demand (B. O. D.), suspended matter, iron and aluminum are given in parts per million. The purified effluent was the supernatant liquor from the secondary clarifier:

| Date | Raw | | Effluent | | Chemicals p. p. m. | | Percent combined reduction |
| --- | --- | --- | --- | --- | --- | --- | --- |
| | B. O. D. | Susp. | B. O. D. | Susp. | Fe+++ | Al | |
| Nov. 22 | 105 | 112 | 5 | 10 | 5 | 1 | 94 |
| 26 | 183 | 180 | 15 | 13 | 10 | 1 | 92 |
| 27 | 143 | 176 | 17 | 18 | 5 | 1 | 89 |
| 28 | 148 | 240 | 20 | 30 | 5 | 1 | 87 |
| 30 | 98 | 172 | 12 | 20 | 8 | 1 | 88 |
| Dec. 3 | 153 | 180 | 19 | 22 | 5 | .5 | 88 |
| 4 | 148 | 160 | 15 | 25 | 5 | 1 | 87 |
| 5 | 133 | 148 | 15 | 26 | 7 | .5 | 86 |
| 6 | 173 | 224 | 9 | 8 | 7 | .5 | 96 |
| 7 | 143 | 128 | 9 | 6 | 10 | 1 | 95 |
| Total | 1,432 | 1,720 | 136 | 178 | | | |
| Average | 143 | 172 | 13.5 | 18 | 6.5 | .85 | 90 |

While I have described my preferred process as including the use of ferric sulphate, it will be understood, as hereinbefore pointed out, that other metal compounds may be used advantageously in accordance with my invention. Thus, for example, ferrous sulphate, when added at an appropriate time may cause a better B. O. D. reduction than can be accomplished in using ferric sulphate. For this reason, and because ferrous sulphate is less expensive than ferric sulphate, the use of ferrous sulphate may be preferable. Also, results similar to those obtained in using ferric sulphate may be obtained by employing aluminum sulphate. Mixtures of various compounds may be employed advantageously, and desirable results may be obtained by adding two or more compounds separately. For example, I have obtained extremely good results by adding small amounts of aluminum sulphate within a minute or two after the final addition of ferric sulphate. The amounts of aluminum sulphate employed were equal to about ten percent of the amounts of ferric sulphate employed. I have also obtained very desirable results by adding a solution made by dissolving both aluminum sulphate and ferric sulphate, about 1 part of aluminum to 10 parts of iron.

The process of my invention is admirably adapted for the treatment of industrial waste liquors as well as ordinary municipal or domestic sewages. It is characteristic of the process of the invention that an extremely rapidly settling sludge is produced and high elimination of putrescible matter is accomplished. Sludge produced in carrying out the method of the invention settles several times as fast as sludge produced in processes in common use. It is not unusual to obtain upon standing for five minutes a clear supernatant liquid which may be decanted, and I have accomplished B. O. D. reductions of more than 96% in the normal operation of the process on many occasions. Preliminary clarification in the primary clarifier usually requires about twenty to thirty minutes, and clarification in the secondary clarifier usually requires about one and one-half to two hours.

I claim:

1. The improvement in the treatment of sewage containing putrescible matter in suspension and in solution which comprises aerating the sewage to effect coagulation of a portion of the suspended matter and to convert a portion of the soluble matter to precipitable form, separating the coagulated matter from the residual sewage, returning a sludge containing said separated coagulated matter to the sewage undergoing treatment by aeration, subjecting the residual sewage to the action of a coagulating agent to precipitate said converted matter, whereby precipitation of soluble matter and coagulation of precipitated and suspended matter is effected, separating the coagulated matter from the accompanying liquor, and returning a sludge containing said coagulated matter to the residual sewage undergoing treatment.

2. The improvement in the treatment of sewage containing putrescible matter which comprises aerating the sewage to effect coagulation of a portion of the putrescible matter, separating the coagulated putrescible matter from the residual sewage, returning at least a part of said separated coagulated putrescible matter to the sewage undergoing treatment by aeration, aerating the residual sewage in the presence of an added compound of a trivalent metal to effect coagulation of residual putrescible matter, separating the coagulated residual putrescible matter from the accompanying liquor, and returning at least a part of said separated residual putrescible matter to the residual sewage undergoing treatment.

3. The improvement in the treatment of sewage containing putrescible matter which comprises aerating the sewage to effect coagulation of a portion of the putrescible matter, separating the coagulated putrescible matter from the residual sewage, returning at least a part of said separated coagulated putrescible matter to the sewage undergoing treatment by aeration, subjecting the residual sewage to the action of a soluble compound of a trivalent metal to effect coagulation of residual putrescible matter therein, separating the coagulated residual putrescible matter from the accompanying liquor, and returning at least a part of said separated residual putrescible matter to the residual sewage undergoing treatment.

4. The improvement in the treatment of sewage containing putrescible matter which comprises aerating the sewage to effect coagulation of a portion of the putrescible matter, separating the coagulated putrescible matter from the residual sewage, returning a sludge containing the separated putrescible matter to the sewage undergoing treatment by aeration, aerating the residual sewage in the presence of added ferric sulphate to effect coagulation of residual putrescible matter, separating the coagulated residual putrescible matter from the accompanying liquor, and reurning a sludge containing the separated residual putrescible matter to the residual sewage undergoing treatment.

5. The improvement in the treatment of sewage containing putrescible matter which comprises aerating the sewage to effect coagulation of a portion of the putrescible matter, separating the coagulated putrescible matter from the residual sewage, returning at least a part of said separated coagulated putrescible matter to the sewage undergoing treatment by aeration, subjecting the residual sewage to the action of soluble compounds of aluminum and iron to effect coagulation of residual putrescible matter therein, separating the coagulated residual putrescible matter from the accompanying liquor, and returning at least a part of said separated residual putrescible matter to the residual sewage undergoing treatment.

JOHN G. BEVAN.